United States Patent [19]

Frank et al.

[11] Patent Number: 5,695,397
[45] Date of Patent: Dec. 9, 1997

[54] AIR EXTRACTOR ASSEMBLY

[75] Inventors: Randy R. Frank, Dearborn; Bert M. Manoukian, West Bloomfield, both of Mich.

[73] Assignee: Ford Global Technologies, Inc., Dearborn, Mich.

[21] Appl. No.: 512,851

[22] Filed: Aug. 9, 1995

[51] Int. Cl.⁶ ...................................................... B60H 1/26
[52] U.S. Cl. ................................................................ 454/164
[58] Field of Search ............................. 454/162, 164, 454/165

[56] References Cited

U.S. PATENT DOCUMENTS 3,405,968 10/1968 Feles et al. ............................ 454/164
4,932,315 6/1990 Dixon .................................... 454/164

FOREIGN PATENT DOCUMENTS 60-161213 8/1985 Japan .................................... 454/164

*Primary Examiner*—Harold Joyce
*Attorney, Agent, or Firm*—Daniel M. Stock

[57] ABSTRACT

An air extractor assembly for an automotive vehicle is provided which includes at least one depression (34) formed in a body panel (14) of an automotive vehicle (10) and including an aperture (52) formed through the depression. An air extractor valve (40) surrounds the depression (32) and includes a base (42) and a flap (44) for controlling fluid communication through the aperture (52) in response to increases in air pressure in the passenger compartment (16) of the vehicle (10) above atmospheric pressure.

7 Claims, 2 Drawing Sheets

AIR EXTRACTOR ASSEMBLY

BACKGROUND OF THE INVENTION

1. Technical Field

The invention relates generally to air pressure equalization mechanisms, and more specifically to air extractor devices for use in automotive vehicle bodies.

2. Description of the Prior Art

It is well known in the automotive vehicle body arts to provide a mechanism for equalizing the pressure between the interior compartment of the automobile and the atmosphere. To effect good heating and air conditioning in a vehicle and to protect the interior compartment of the vehicle from the elements, the interior or passenger compartment of the vehicle is substantially sealed from the atmosphere. During certain vehicle operating conditions, however, air pressure in the interior passenger compartment may exceed atmospheric pressure. This condition occurs routinely when a vehicle door is closed when entering or exiting the vehicle. If the interior is not vented to the atmosphere, the effort required to close the door may greatly increase, inconveniencing the operator of the vehicle.

Functional solutions to this problem are well known. They include the provision of some sort of pressure responsive device interposed between the passenger compartment and the exterior of the vehicle. Heretofore, however, the solutions have been found to be disadvantageous in at least two respects. The solutions have normally involved the piercing of the vehicle body with a through aperture into which is inserted a valve body which includes elements movable in response to an increase in pressure within the passenger compartment to open and pass air outwardly into the atmosphere while returning to a closed position to prevent communication outwardly from the atmosphere into the passenger compartment. The simple piercing of the vehicle body in some instances may reduce the strength of the body panel adjacent the piercing. This tends to restrict the locations chosen for mounting the valve body. Furthermore, and more importantly, the multiplicity of parts making up the housing and its attendant valve structure has been found to be unduly complex and expensive.

SUMMARY OF THE INVENTION

Responsive to the disadvantages of the prior art air extractor devices, the present invention provides an air extractor assembly for use in an automotive vehicle body which provides at least one depression formed in a body panel defining the interior compartment of the body, at least one aperture formed through the body panel within that depression, and an extractor valve member secured to the body panel in surrounding relationship with respect the depression which is operative to effect fluid communication between the interior compartment of the body and the atmosphere when the air pressure within the interior compartment exceeds a predetermined difference over the atmospheric pressure.

According to one aspect of the invention, an extractor valve member is provided which spans two vertically spaced depressions in the automotive body panel and includes a frame-like base surrounding one of the depressions from which is hingedly suspended a pair of flap members operative to control fluid communication through apertures formed in each of the depressions.

According to another aspect of the present invention, a single depression is formed in the body panel and a sheet-like base member including a plurality of flaps closing apertures through it controls fluid communication through at least one aperture formed through the depression.

BRIEF DESCRIPTION OF THE DRAWINGS

These and other advantages and aspects of the present invention will be apparent to those skilled in the automotive body arts upon reading the following description with reference to the accompanying drawings, in which.

DESCRIPTION OF THE PREFERRED EMBODIMENTS

Figure 1:
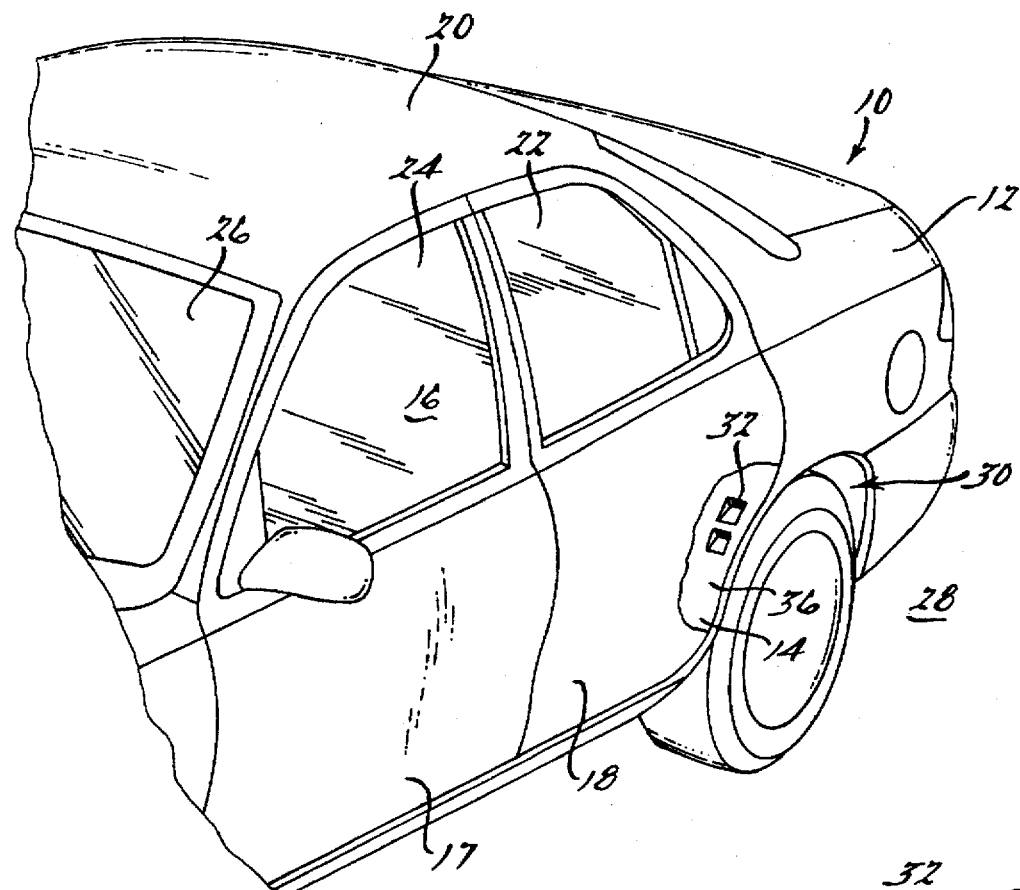
FIG. 1 is a partial perspective view of an automotive vehicle in which an air extractor assembly according to the present invention is installed.

Turning now to drawings, and in particular to FIG. 1 thereof, an automotive vehicle 10 is illustrated as including a body, indicated generally at 12. The body 12 includes various interior surfaces, such as that indicated at 14, which enclose an interior passenger compartment 16 in cooperation with other portions of the vehicle body 12 such as doors 17, 18, roof 20, and windows 22, 24, 26. In the embodiments illustrated, fluid communication between the passenger compartment 16 and the atmosphere 28 is effected through the wheel well area indicated at 30 by means of an air extractor assembly 32 according to the present invention.

Figure 2:
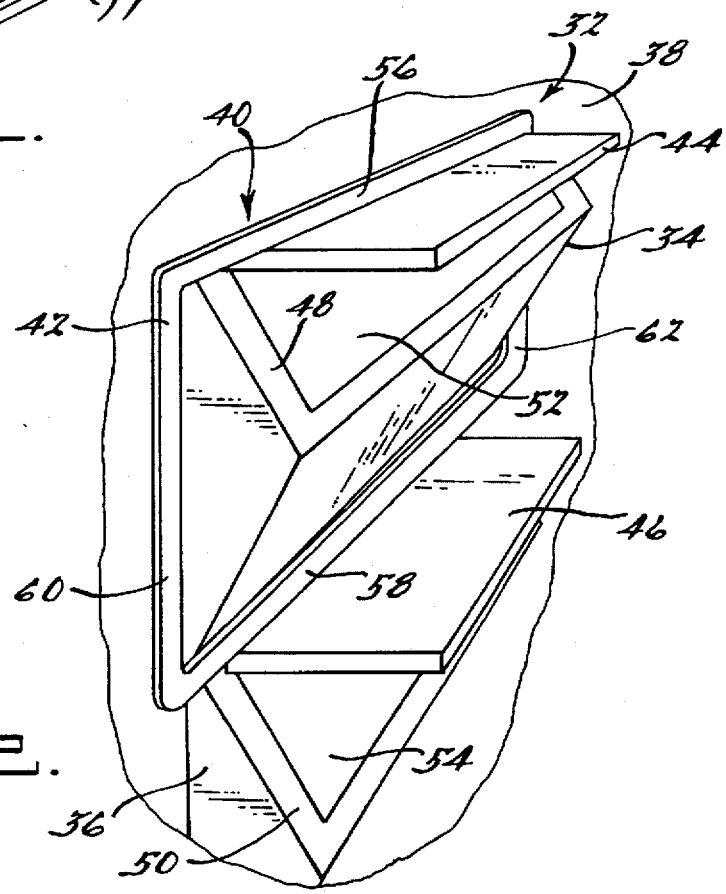
FIG. 2 is a partial perspective view of one embodiment of an air extractor assembly according to the present invention.

Turning next to FIG. 2, one embodiment of the air extractor assembly 32 is illustrated, which includes a pair of vertically spaced depressions 34, 36 formed in the interior panel 14 of the body 12. According to the preferred embodiment illustrated, the body panel 14 is preferably formed as a sheet metal stamping and includes an inner surface indicated at 36 and an outer surface as indicated at 38.

The air extractor assembly 32 in the embodiment illustrated in FIG. 2 comprises, in addition to the vertically spaced depressions 34, 36, an air extractor valve 40 that is fixedly secured in any conventional manner, such as through pins, rivets and the like, to the sheet metal body panel 14. The air extractor valve 40 is operative to permit fluid communication between the passenger compartment 16 and the atmosphere 28 when operatively positioned as shown in FIG. 2, that operative position being attained when the air pressure within the passenger compartment 16 exceeds that in the atmosphere 28 by a predetermined amount.

The air extractor valve 40 is illustrated as comprising a base 42 and a pair of flap members 44, 46. Each depression 34, 36 includes a downwardly rearwardly extending canted wall 48, 50, each pierced by an aperture 52, 54, and the flap members 44, 46 overlie the apertures 52, 54 so that, in a normal closed position, the apertures 52, 54 are blocked, preventing fluid communication between the passenger compartment 16 and the atmosphere 28, and when open, as shown in FIG. 2, such communication is effected.

The base member 42 is preferably formed as a frame-like member having an upper leg 56 positioned above the upper depression 34 and a lower leg 58 positioned vertically intermediate the depressions 34, 36. A pair of laterally spaced side legs 60, 62 join the upper and lower legs 56, 58 to define the frame structure and surround the upper depression 34. The flap members 44, 46 are hingedly connected to the upper and lower legs 56, 58, respectively, and are preferably formed together with them as an integral molded plastic part in a two shot molding process known to those skilled in the manufacture of plastic components for automotive assemblies.

Figure 3:
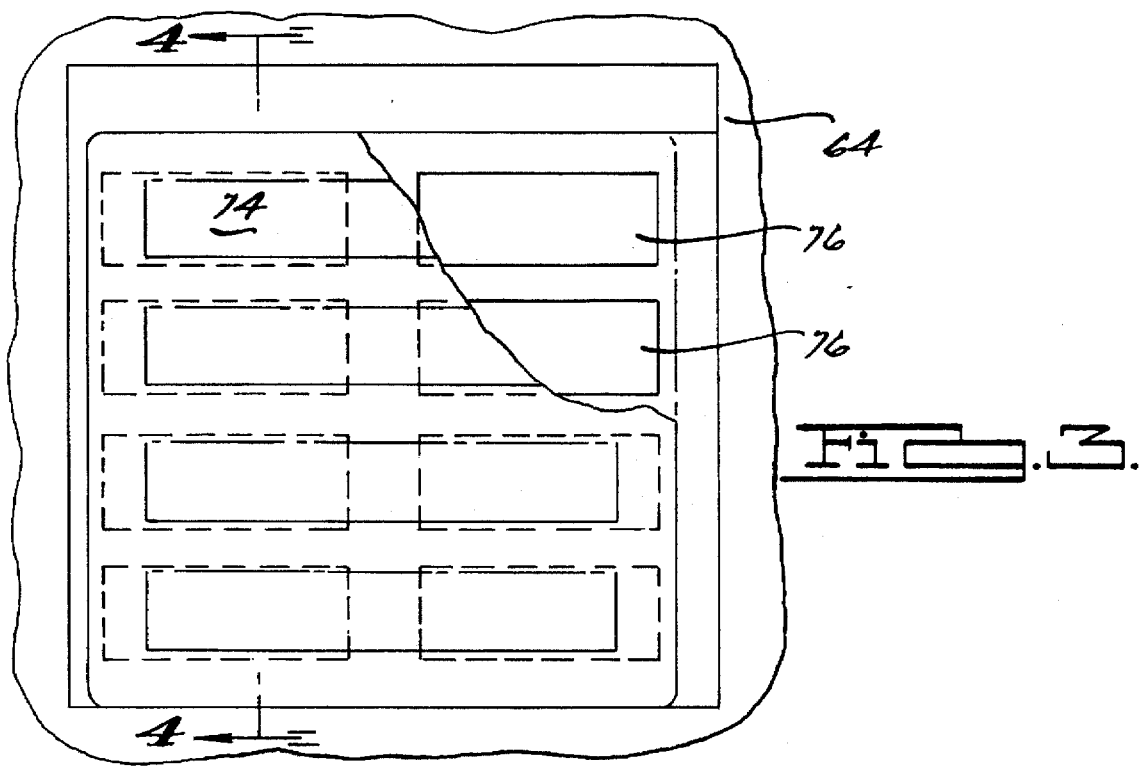
FIG. 3 is a front view of an alternative embodiment of an air extractor according to the present invention.
Figure 4:
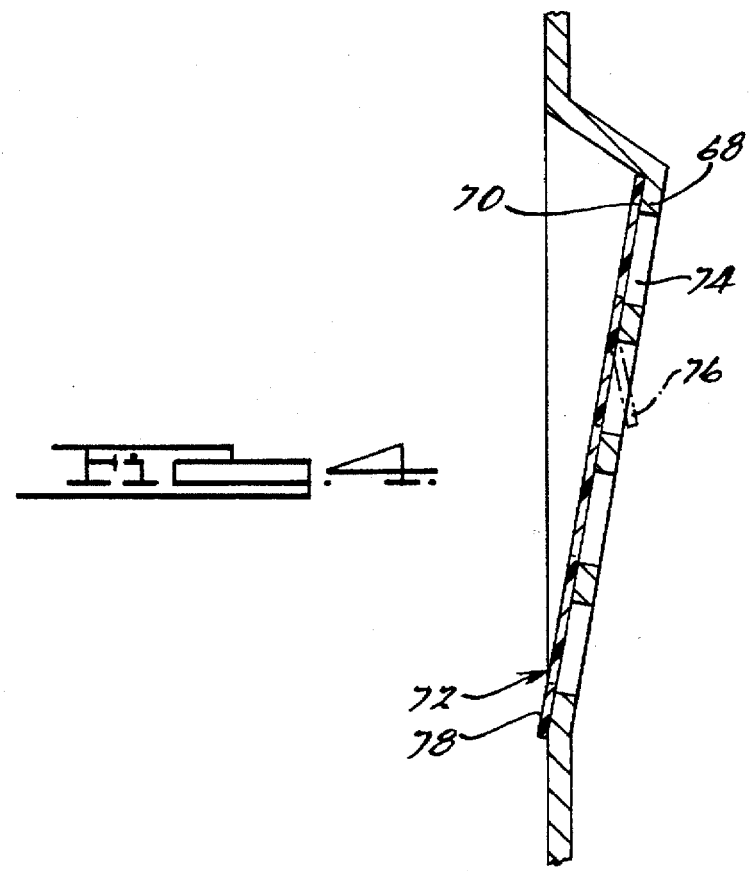
FIG. 4 is a cross sectional view of the embodiment of FIG. 3 taken along line 4—4 of FIG. 3.

Turning next to FIGS. 3 and 4, an alternative embodiment of the air extractor assembly 32, illustrated generally at 64, is illustrated as being formed to include a single depression 66 formed in the sheet metal panel 14. The depression 66 defines an upwardly rearwardly canted wall 68 defining an inwardly facing surface 70 on which is mounted an air extractor valve 72. The wall 68 is illustrated as being pierced by a plurality of laterally extending slots 74, as may best be seen in FIG. 3. The air extractor valve 72 is preferably formed from plastic sheet material and includes an array of resilient flaps, indicated generally at 76, which register with the slots 74 and are movable in reed valve fashion between an open position, as shown in FIG. 4, and a closed position, closing the slots to effect the same function as the flaps 44, 46 of the FIG. 2 embodiment. The flaps 76 are hingedly arranged with respect to base portion 78 of the air extractor valve 72. The entire assembly of flaps 76 and base 78 are preferably formed from sheet material that is adhesively backed for easy, fixed securement to the surface 70 of the depression wall 68.

While only two embodiments of the air extractor assembly according to the present invention have been described, others may occur to those skilled in the automotive body air handling and closure arts will appreciate others may be possible without departing from the scope of the following claims.

What is claimed is:

1. An air extractor assembly for an automotive vehicle having a body including an interior compartment and a body panel having an interior surface bounding the interior compartment and an exterior surface bounding the interior compartment and an exterior surface open to the atmosphere, the air extractor assembly being operative to control fluid communication between the interior compartment and the atmosphere, and comprising:

at least one depression formed in said body panel;

at least one aperture formed through said body panel within said depression; and an extractor valve member having a base portion fixedly secured to said body panel; and flap means integrally formed with said base portion, said base portion and flap means formed of adhesively backed sheet material for fixedly securing to the body panel and surrounding said at least one depression and flap means being integrally formed with said base portion and movable between a close position covering said at least one aperture and an open position when the air pressure in the interior compartment exceeds the atmospheric pressure by said predetermined amount.

2. An air extractor assembly as defined in claim 1 wherein said base portion and said flap means comprise an integrally molded plastic part.

3. An air extractor assembly as defined in claim 1 wherein said body is formed as a sheet metal stamping.

4. An air extractor assembly as defined in claim 1 wherein said flap means comprises a plurality of flaps mounted for pivotal movement with respect to said base member.

5. An air extractor assembly as defined in claim 1 wherein said extractor valve member is fixedly secured to said body panel interior surface.

6. An air extractor assembly for an automotive vehicle having a body including an interior compartment and a sheet metal body panel having an interior surface bounding the interior compartment and an exterior surface open to the atmosphere, the air extractor assembly being operative to control fluid communication between the interior compartment and the atmosphere, and comprising:

a single depression formed in said sheet metal body panel projecting outwardly from said sheet metal body panel inner surface and defining an upwardly outwardly canted wall pierced by at least one aperture; and an air extractor valve having a base adhesively secured to said canted wall and having a plurality of passages formed therethrough in fluid communication with said at least one aperture and a plurality of flaps integrally formed with said base and hingedly arranged with respect thereto and operative to move from positions closing said passages to positions opening said passages only when the air pressure in the interior compartment exceeds atmospheric pressure by a predetermined amount.

7. An air extractor assembly as defined in claim 6 wherein said base and said flaps are formed of adhesively backed plastic sheet material.

* * * * *